United States Patent [19]
O'Brien

[11] Patent Number: 5,522,938
[45] Date of Patent: Jun. 4, 1996

[54] PARTICLE REMOVAL IN SUPERCRITICAL LIQUIDS USING SINGLE FREQUENCY ACOUSTIC WAVES

[75] Inventor: Sean O'Brien, Plano, Tex.

[73] Assignee: Texas Instruments Incorporated, Dallas, Tex.

[21] Appl. No.: 287,316

[22] Filed: Aug. 8, 1994

[51] Int. Cl.⁶ ..................................................... B08B 3/12
[52] U.S. Cl. ..................................... 134/1; 134/2; 134/38
[58] Field of Search ................................ 134/1, 2, 10, 38

[56] References Cited

U.S. PATENT DOCUMENTS

| | | | |
|---|---|---|---|
| 4,836,684 | 6/1989 | Javorik et al. | 134/1 |
| 5,013,366 | 5/1991 | Jackson et al. | 134/1 |

Primary Examiner—Scott Kastler
Attorney, Agent, or Firm—Jacqueline J. Garner; Richard L. Donaldson; William E. Hiller

[57] ABSTRACT

A method and apparatus for particle removal in supercritical fluids using a single frequency acoustic wave. A wafer (114) is placed in a process chamber (110) and cleaning gas is introduced through inlet port (116). The cleaning fluid is heated to at least the critical temperature of the cleaning fluid and may also be pressurized. A sonic wave is generated in process chamber (110) by sonic transducer (122) to create alternating bands of gas phase (G) and supercritical phase (SC) of the cleaning fluid. The sonic wave is preferably a traveling wave such that the gas (G) and supercritical (SC) phases move across the surface of wafer (114) removing contaminants from the wafer (114) and trapping them in the acoustic wave. The contaminants are then removed from the system with spent cleaning fluid through outlet port (118).

12 Claims, 2 Drawing Sheets

PARTICLE REMOVAL IN SUPERCRITICAL LIQUIDS USING SINGLE FREQUENCY ACOUSTIC WAVES

FIELD OF THE INVENTION

This invention generally relates to wafer cleaning and more specifically to particle removal in supercritical liquids using acoustic waves

BACKGROUND OF THE INVENTION

Supercritical fluids are currently being investigated for semiconductor wafer cleaning. Supercritical fluids possess liquid-like solvating properties and gas-like diffusion and viscosity that enables rapid penetration into crevices and boundary layer films with removal of organic and inorganic contaminants contained therein. A key property of a supercritical fluid is that above a critical temperature, condensation cannot occur at any pressure. A phase diagram for $CO_2$ is shown in FIG. 1. Above this critical temperature, the fluid will either be a gas (if the pressure is below the critical pressure) or a supercritical liquid (if the pressure is above the critical pressure). For $CO_2$, the critical temperature is 31° C. and the critical pressure is 73 bar (1050 psi).

One prior art method of supercritical fluid extraction involves cycling the pressure of the cleaning chamber between supercritical and subcritical values. $CO_2$ pressurized at approximately 800 psi is supplied to the cleaning chamber. During cleaning, the $CO_2$ fluid is pulsated by a hydraulic mechanism and the cleaning chamber is constructed such that pulsating the fluid changes the chamber height. The pressure of the supercritical fluid is varied according to the volume of the cleaning chamber. The pressure is cycled between 800 and 1200 psi at a frequency of 25 to 50 Hz. During the compression cycle, the cleaning fluid (in a supercritical state) penetrates crevices and molecular layers, as shown in FIG. 2a. During the expansion cycle, the cleaning fluid changes to a subcritical gas. Density decreases significantly. This can cause rapid mixing actions and outflow of fluid and contaminants from the wafer surfaces, as shown in FIG. 2b. Dislodged contaminants may then flushed out of the system when new cleaning fluid is added.

One problem with pressure cycling for supercritical wafer cleaning, however, is that the location of the phase transition between gas and supercritical liquid is arbitrary and the motion of particles (i.e., contaminants) is random. This can lead to inefficient and/or incomplete removal of contaminants. Accordingly, there is a need for better control of particle motions/removal and thus, better control of the location of the phase transition between gas and supercritical liquid.

SUMMARY OF THE INVENTION

A method and apparatus for particle removal in supercritical liquids using acoustic waves is disclosed herein. In one embodiment, a wafer is placed in a process chamber and a cleaning fluid is introduced. The cleaning fluid is heated to at least the critical temperature of the cleaning fluid and may also be pressurized. A sonic wave is generated in the chamber by at least one sonic transducer. The sonic wave causes a variation in pressure that creates a plurality of alternating gas phase regions and supercritical phase regions across the wafer. The variation in pressure caused by the sonic wave removes contaminants from the wafer surface. The frequency and intensity of the sonic wave are easily control, thus allowing better control over the location of the interface regions and thus particle motion and removal.

An advantage of the invention is providing a method for particle removal using supercritical liquids that allows for better control over the location of the gas-supercritical liquid interface region.

Another advantage of the invention is providing a method for particle removal using supercritical liquids that offers better control over particle positions and removal.

Another advantage of the invention is providing a dry non-contact method of particle removal from wafer surfaces.

These and other advantages will be apparent to those skilled in the art having reference to the specification in conjunction with the drawings.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

The invention described herein uses an acoustical wave to control the transition of a fluid from gas to supercritical liquid for wafer cleaning. A supercritical liquid posesses liquid-like solvating properties and gas-like diffusion and viscosity that enables rapid penetration into crevices and boundary layer films for removal of contaminants contained therein. A fluid, such as $CO_2$, transitions from a gas to a supercritical liquid at a given temperature and pressure, called the critical temperature and the critical pressure. The critical temperature and pressure varies from fluid to fluid. Above the critical temperature, condensation will no longer occur at any pressure and the fluid will only exist in the gas or supercritical phases. Whether the fluid exists as a gas or supercritical liquid depends on the pressure.

Figure 1:
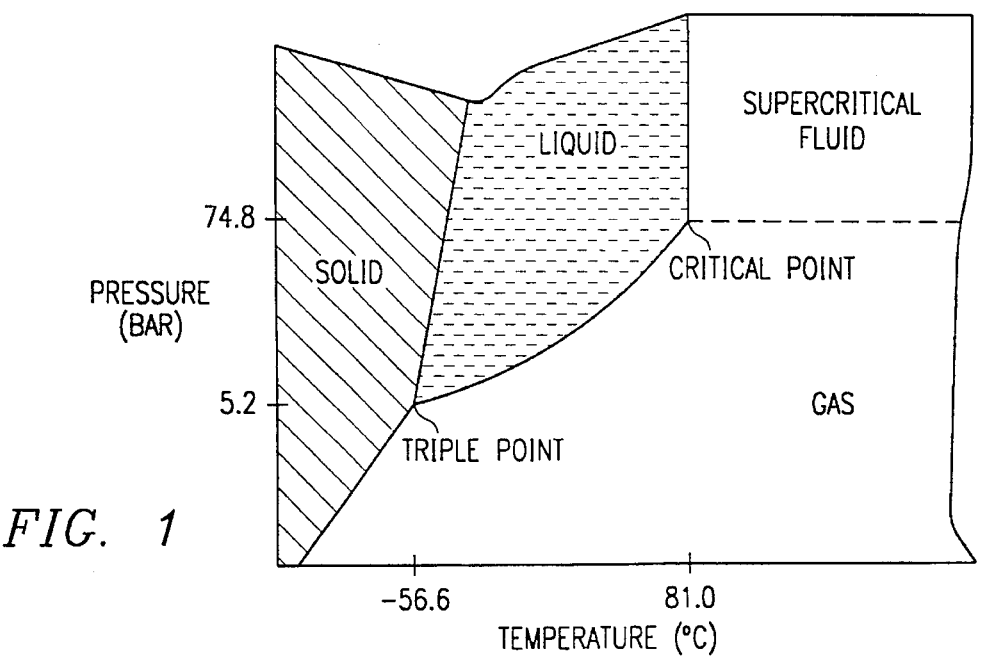
FIG. 1 is a phase diagram for carbon dioxide.
Figure 2A:
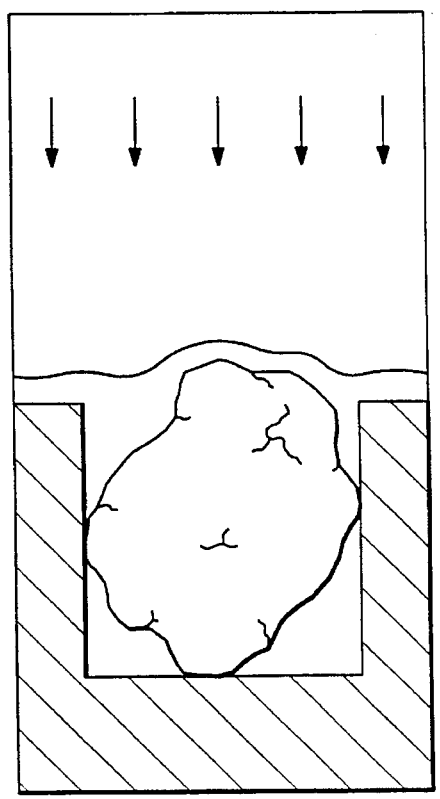
FIGS. 2a and b are block diagrams of a contaminant removal due to pressure cycling.
Figure 2B:
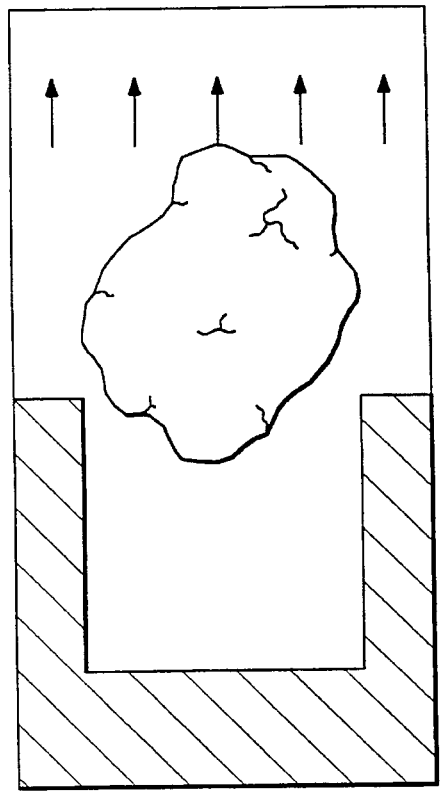
Figure 3:
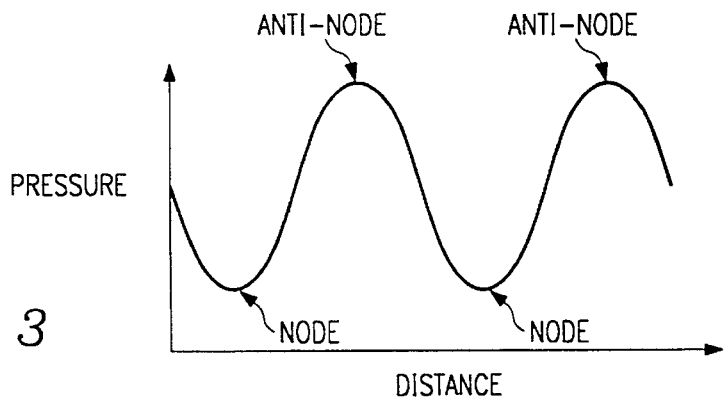
FIG. 3 is a graph of the pressure of a sonic wave versus distance.
Figure 4:
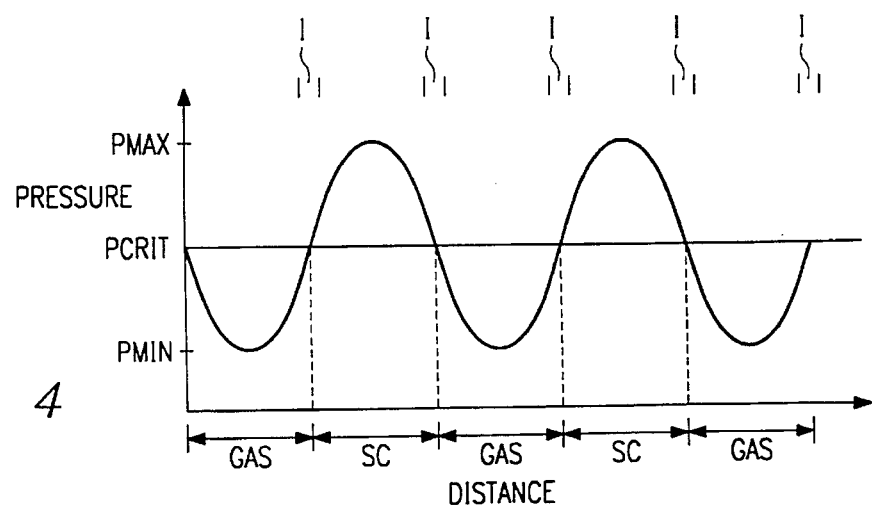
FIG. 4 is a graph of a sonic wave showing supercritical and gas phase regions relative to the sonic wave.

In an acoustic (sonic) wave, the pressure oscillates as shown in FIG. 3. The minimum pressure occurs at the nodes of the acoustic wave and the maximum pressure occurs at the anti-nodes. By properly adjusting the frequency and intensity of the sonic wave, a grating of alternating regions of gas and supercritical liquid can be precisely controlled. If the maximum pressure is greater than the critical pressure and the minimum pressure is less than the critical pressure, alternative bands of gas, G and supercritical liquid, SC will form as shown in FIG. 4. Although FIG. 4 shows the critical pressure, Pcrit midway between the maximum, Pmax, and minimum, Pmin, pressure, this is not necessary. For example, it may be desired to have a smaller supercritical liquid region SC. In that case the critical pressure Pcrit would be closer to the maximum pressure Pmax. The width of the supercritical region SC is controlled by the acoustic frequency and the relationship between the average pressure and the critical pressure Pcrit. If the average pressure is larger than the critical pressure Pcrit, the supercritical region SC will be larger and if the average pressure is smaller than the critical pressure Pcrit, the gas region G will be larger.

The interface zone I is the location where the fluid transitions between the gas phase and the supercritical phase. By varying the frequency, the number of interface zones I can be controlled. The location of the interface zones I is controlled by the frequency as well as the relationship between the average pressure and the critical pressure Pcrit.

It is believed that the interlace zone (I) traps particles due to competing attractive and repulsive forces. However, as long as the particles can be forced to remain at a specific phase relationship with respect to the wave's spatial pattern, the motion of the particles is controlled. Thus, particles can be removed whether the particles are trapped in the interface zone (I), are pulled into the nodes, are pushed into the anti-nodes, or prefer some other specific pressure.

Figure 5:
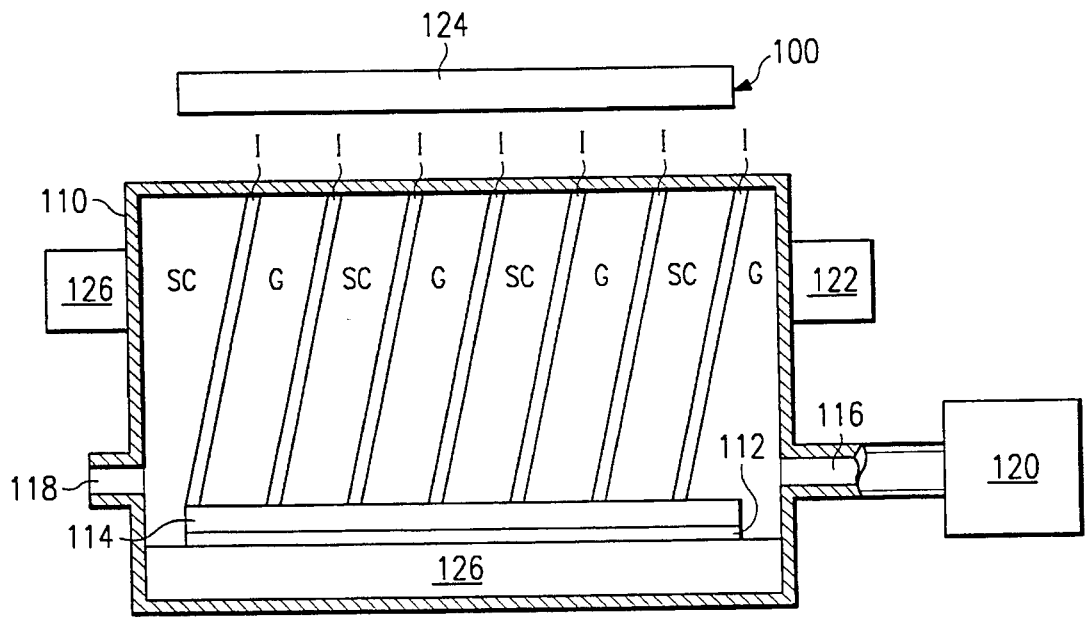
FIG. 5 is a block diagram of a wafer cleaning apparatus according to an embodiment of the invention.

A wafer cleaning apparatus 100 according to an embodiment of the invention is shown in FIG. 5. Apparatus 100 is shown by way of example only and not by way of limitation. A process chamber 110 contains a chuck 112 for holding a wafer 114 and inlet 116 and outlet 118 ports for introducing and removing gas, respectively. Gas supply network 120 is connected to inlet port 116 for supply an appropriate gas or gases (such as $CO_2$) to process chamber 110. Gas supply networks, such as network 120, are well known in the art. The temperature and pressure of process chamber 110 are controlled by conventional means. For example, the process chamber may be heated by lamps in a lamp heating module 124 as is well known in the art and the pressure may be controlled by a conventional vacuum pump 126.

Sonic transducer 122 may comprise a single transducer or multiple transducers. Sonic transducer 122 generates a sonic wave in process chamber 110 across wafer 114. Preferably, the sonic wave is generated parallel with the surface of the wafer 114. The intensity and frequency of the sonic wave will vary by application, but may preferably be on the order of 100 kHz, respectively. The sonic wave is preferably a traveling wave, but may alternatively be a standing wave. If a standing wave is produced, optional circuitry 126 must be added to move the wafer through the sonic cavity created in process chamber 110. A traveling wave is produced by detuning the resonance frequency of the acoustic wave. The velocity of the traveling wave is easily controlled by spatial adjustments to the sonic cavity and/or frequency detuning. The shape of process chamber 110 may thus be optimized for a particular velocity of the sonic wave generated by sonic transducer 122.

In operation, a wafer (or wafers) 114 are placed in process chamber 110. A cleaning fluid such as $CO_2$, is continuously introduced to the process chamber 110 through inlet port 116 at a given pressure on the order of the critical pressure for the cleaning fluid used and the process chamber is heated to at least the critical temperature. The given pressure is something less than twice the critical pressure. The cleaning fluid selected preferably has a critical temperature and pressure consistent with existing technology (i.e., $0°<T_c<100°$ C. and 1 atm<1000 atm).

A sonic wave is generated in process chamber 110 by sonic transducer 122 having a frequency on the order of 100 kHz. The sonic wave is generated roughly in parallel with the surface of wafer 114 and creates alternating bands of gas phase G and supercritical phase SC regions. Preferably, the resonance frequency of the sonic wave is detuned to create a traveling wave, in which case, of course, the alternating bands move across the surface of the wafer. The extent of detuning and the configuration of the process chamber determine the velocity of the traveling wave. In a resonant cavity (i.e., the process chamber) driven slightly off resonance, the nodal patterns will move in a precise manner and the velocity is well controlled. Both the speed and direction are adjustable.

In a traveling wave, the interface regions (I) travel across the surface of the wafer 114. As a result, the pressure at each point across the wafer is changing and correspondingly, the cleaning fluid at each point is transitioning between the gas and supercritical phases. The cycling between gas and supercritical phases causes contaminants to dislodge from the surface of the wafer 114. Dislodged contaminants become trapped in the traveling wave and are carried out of process chamber 110 in spent cleaning fluid through outlet port 118.

Alternatively, if a standing wave is used, the wafer 114 must be moved through the sonic cavity such that each point on the wafer moves through the sonic wave. As the wafer moves, the pressure at each point varies between the minimum and maximum pressure and the cleaning fluid changes between gas and supercritical phases. As described above, the cycling of phases causes contaminants to become dislodged from the surface of the wafer and trapped in the sonic wave, essentially dissolved in the fluid. As new cleaning fluid is added and spent fluid removed, the contaminants are removed from the system with the spent fluid through outlet port 118.

In both the standing and traveling wave cases, the movement of particles can be controlled in a non-contact use of sonic energy. In the supercritical phase, the cleaning fluid is compressed and penetrates into crevices and boundary layers. When the cleaning fluid transitions to the gas phase, the density decreases and the cleaning fluid expands dislodging any contaminants from the surface of wafer 114. The dislodged contaminants then become trapped in the sonic wave and are removed from the system with the spent cleaning fluid.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for particle removal comprising the steps of:

introducing a cleaning fluid to a process chamber;

heating the cleaning fluid to at least the critical temperature of the cleaning fluid; and generating a single frequency acoustic wave in a process chamber wherein said step of generating said single frequency acoustic wave creates a plurality of gas phase regions, a plurality of supercritical phase regions, and a plurality of interface regions between each gas phase region and each supercritical phase region, said pluralities of gas phase regions, supercritical phase regions and interface regions existing simultaneously in said process chamber.

2. The method of claim 1, further comprising the step of pressurizing said cleaning fluid to a pressure on between zero and twice the critical pressure of the cleaning fluid.

3. The method of claim 1, wherein said introducing a cleaning fluid step continuously introduces cleaning fluid and removes used cleaning fluid.

4. The method of claim 1, wherein said step of generating said single frequency acoustic wave comprises the step of generating a single frequency traveling acoustic wave.

5. The method of claim 1, further comprising the step of moving a wafer through said single frequency acoustic wave, wherein said single frequency acoustic wave is a standing wave.

6. The method of claim 1, wherein said single frequency acoustic wave has an intensity less than twice the critical pressure of the cleaning fluid.

7. The method of claim 1, wherein said single frequency acoustic wave is generated parallel to the surface of a wafer.

8. A method for wafer cleaning, comprising the steps of:
   a. placing a wafer in a process chamber;
   b. introducing a cleaning fluid to said process chamber;
   c. heating said cleaning fluid to at least the critical temperature of said cleaning fluid; and
   d. generating a sonic wave in said process chamber such that a maximum pressure is greater than the critical pressure of the cleaning fluid and a minimum pressure is less than the critical pressure of the cleaning fluid.

9. The method of claim 8, further comprising the step of pressurizing said cleaning fluid to a pressure on the order of the critical pressure of said cleaning fluid.

10. The method of claim 8, wherein said sonic wave is a traveling wave.

11. The method of claim 8, further comprising the step of moving said wafer through said sonic wave, wherein said sonic wave is a standing wave.

12. The method of claim 8, wherein a plurality of contaminants from the surface of the wafer become trapped in said sonic wave and are removed from the process chamber.

* * * * *